Figure 1:
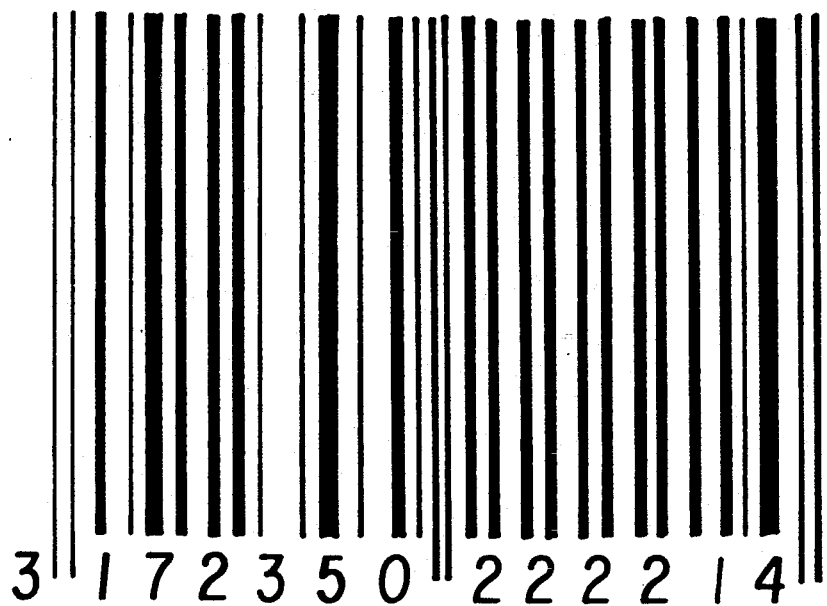

United States Patent [19]

Eid et al.

[11] Patent Number: 5,252,987
[45] Date of Patent: Oct. 12, 1993

[54] PROCESS AND APPARATUS TO FORM ON A MAGNETIC TAPE A LATENT IMAGE BY MEANS OF RECORDING AND ERASING MAGNETIC HEADS

[75] Inventors: Bernard Eid, Champagne sur Seine; Jean-Marie Vau, Gueret, both of France

[73] Assignee: Eastman Kodak Company, Rochester, N.Y.

[21] Appl. No.: 585,160
[22] PCT Filed: Mar. 25, 1989
[86] PCT No.: PCT/EP89/00334
§ 371 Date: Mar. 26, 1991
§ 102(e) Date: Mar. 26, 1991
[87] PCT Pub. No.: WO89/09978
PCT Pub. Date: Oct. 19, 1989

[30] Foreign Application Priority Data
Apr. 13, 1988 [FR] France .................................. 8805110

[51] Int. Cl.$^5$ ................................................ G11B 9/00
[52] U.S. Cl. ................................................... 346/74.2
[58] Field of Search .............................. 346/74.2–74.5

[56] References Cited
U.S. PATENT DOCUMENTS

| | | | |
|---|---|---|---|
| 4,051,484 | 9/1977 | Martin | 346/74.1 |
| 4,072,957 | 2/1978 | Kokaji et al. | 346/74.1 |
| 4,380,768 | 4/1983 | Palombo et al. | 346/74.5 |
| 4,739,342 | 4/1988 | Dove et al. | 346/74.5 |

Primary Examiner—George H. Miller, Jr.
Attorney, Agent, or Firm—William W. Holloway

[57] ABSTRACT

Process for magnetographic printing and apparatus for carrying out said process, said process being characterized in that:
a) a first information is recorded
b) part the of information recorded at step (a) is erased
c) a second information is recorded, at least one part of said second information is recorded in the area erased during step (b).

Apparatus comprising at least three magnetic heads with at least one erasing head and two recording heads, characterized in that said erasing head is arranged so as to erase the writing area (14) common to at least two recording heads.

Application to continuous printing of information of the bar code type.

6 Claims, 9 Drawing Sheets

PROCESS AND APPARATUS TO FORM ON A MAGNETIC TAPE A LATENT IMAGE BY MEANS OF RECORDING AND ERASING MAGNETIC HEADS

The invention relates to a process for magnetographic printing (namely bar codes) involving an arrangement of recording and erasing heads.

In the prior art, several methods for printing bar codes are known. Among others, the fourth more current are:

ink jet printing of bar codes: this method does not allow a definition lesser than the diameter of the ink drop, i.e. 120 μm; in addition, it exhibits the drawback of having a maximum height of 8 mm per head. Therefore to obtain a code bar higher, several adjacent heads are necessary;

thermal printing of bar codes: U.S. Pat. No. 4,661,001, discloses the use of a thermal head for realizing said codes. Upon continuous printing, the method does not allow a very fast printing. It is difficult to go beyond 10 cm/s. Moreover, the printing obtained by a thermal process is not very stable with time;

laser printing of bar codes, this method does not allow continuous printing;

matricial printing, i.e. dot printing for bar codes; this method provides a poor graphic definition (about 250 μm) and a printing quality which is insufficient for certain applications.

On the other hand, several devices involve assemblies of magnetic reading/writing and erasing heads. French Patent 2,583,550 discloses such an arrangement. In this patent relating to the reading of credit cards and detection of fraudulent use of these cards, after a first passage of the reading head, the personal identification number is compared with the card number and with a list of rejected numbers. If the use is fraudulent, a second passage allows to erase at least one track of the card to render it useless. This patent does not contain any indication of a simultaneous use of an erasing head and a writing head on the same magnetic support, as it is the case for the present invention.

Therefore, the present invention remedies the above-cited drawbacks of the prior art:

by making it possible to print information of various nature on a magnetic tape by means of an assembly of magnetic writing heads and magnetic erasing heads, upon a single passage of the magnetic tape in front of these heads;

by allowing a continuous magnetographic printing at a speed higher than in the prior art (with the process of the invention, speeds about 1 m/s can be obtained) and particularly comprised between 20 cm/s and 100 cm/s;

by providing a printing having a great stability and a good graphic definition (about 75 μm).

Other objects of the invention will be disclosed in the following description.

The invention relates to a process for forming on a magnetic tape a latent image comprising two distinct information areas, overlapping each other, by means of an assembly of erasing and recording magnetic heads, said process being characterized in that it comprises the following stages:

a) the registration of a first type of information on a defined area of the magnetic web, b) a partial erasing of said information registered during stage a);

c) the registration of a second type of information a part of which, at least, being in the area erased during stage b).

Figure 2:
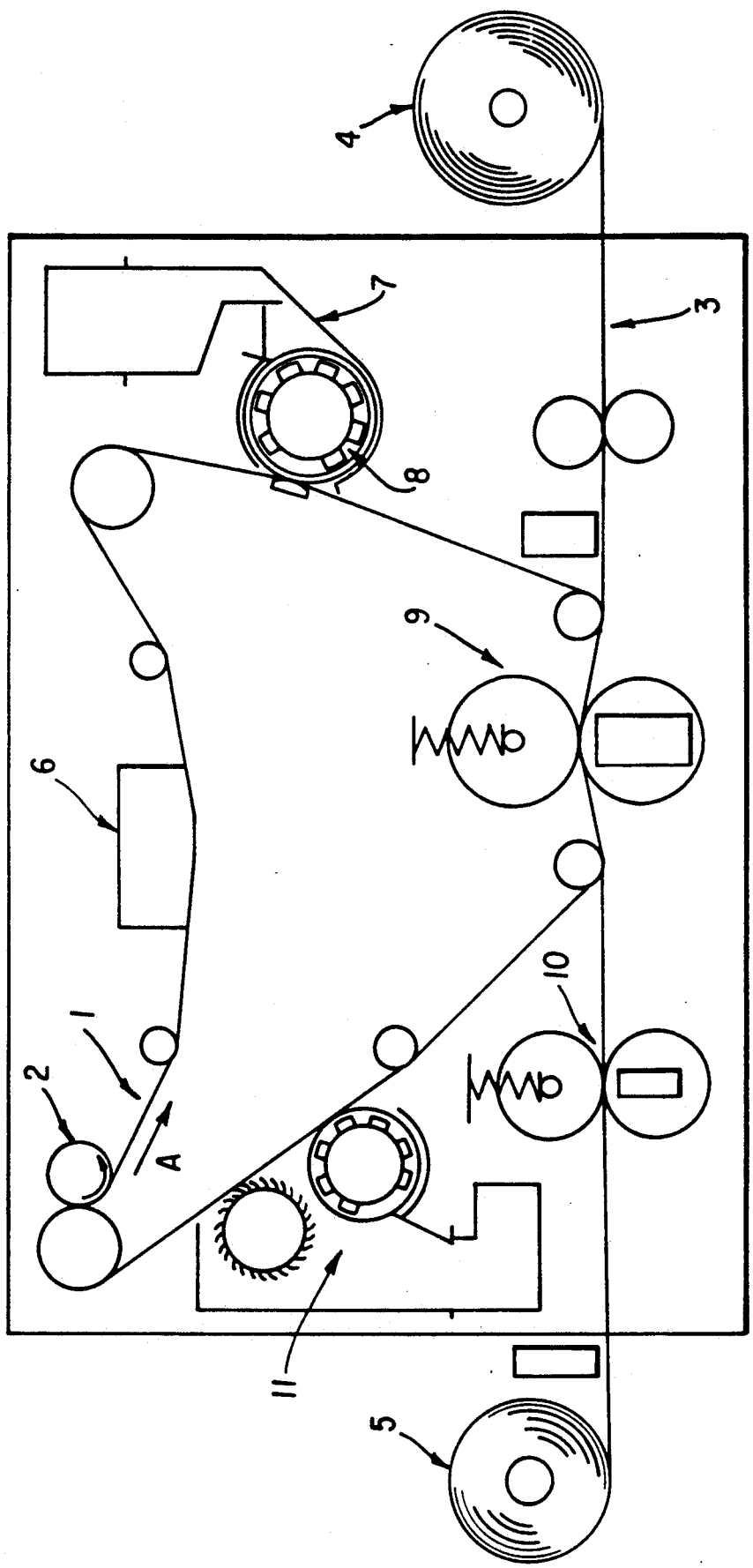
Figure 3:
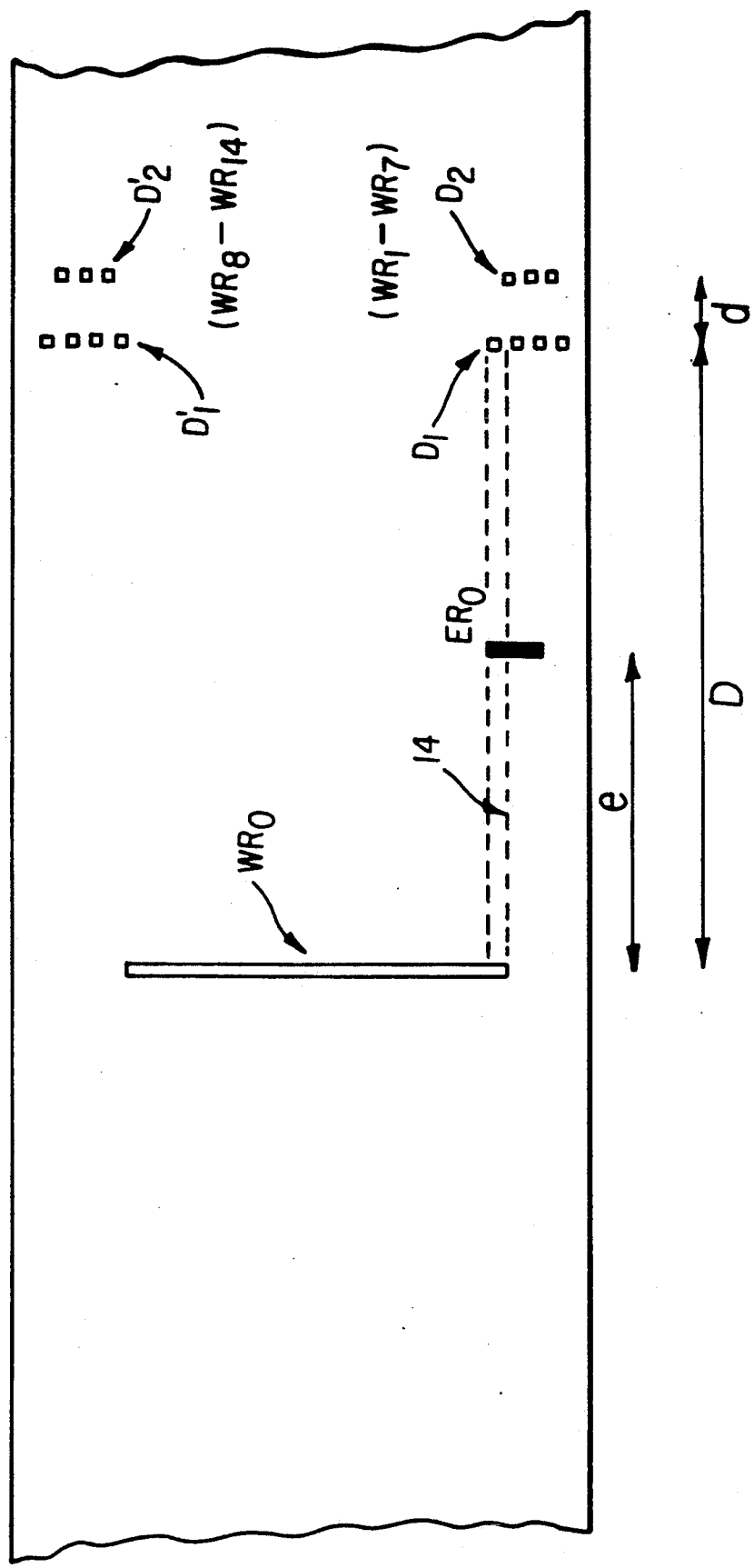
Figure 4:
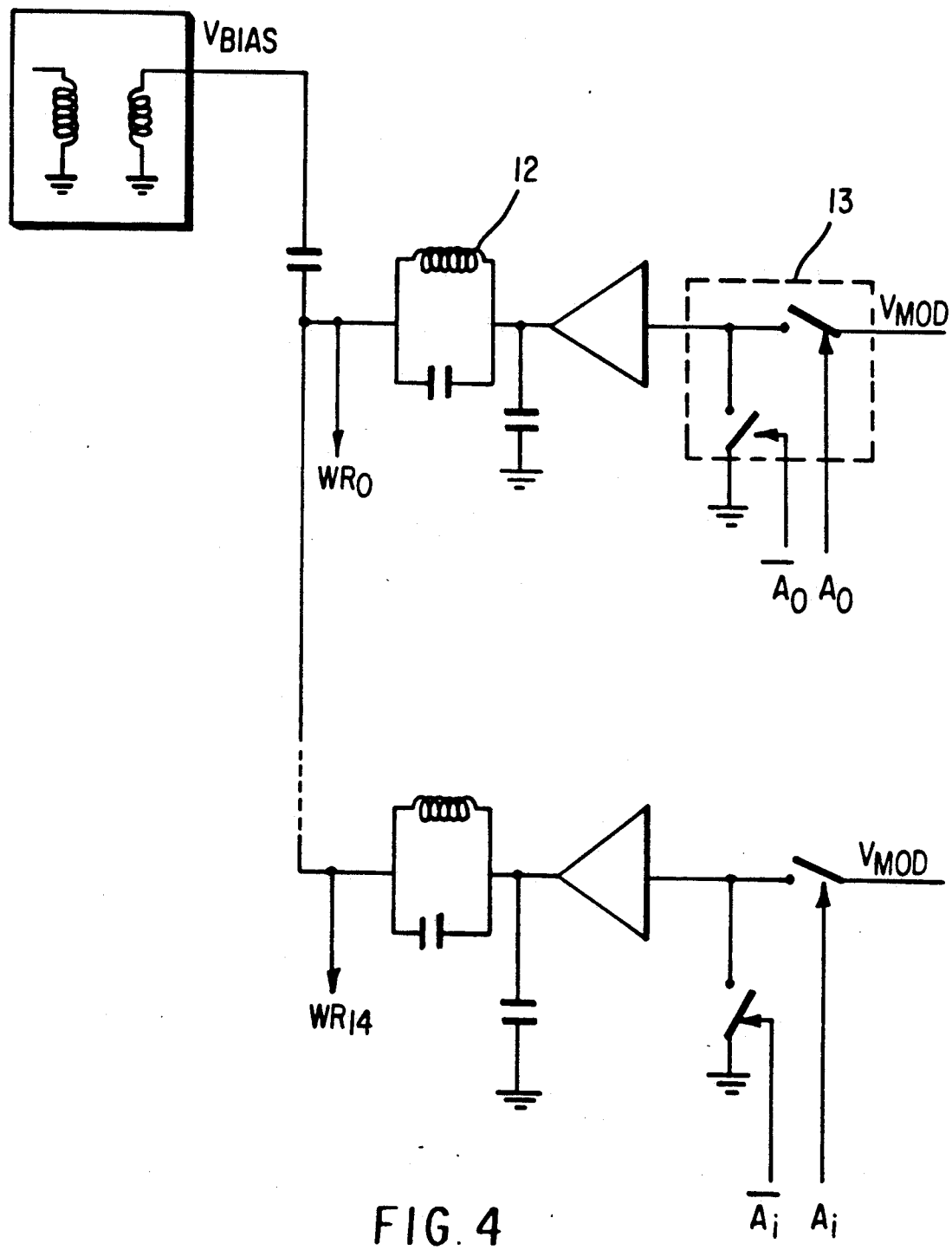
Figure 4A:
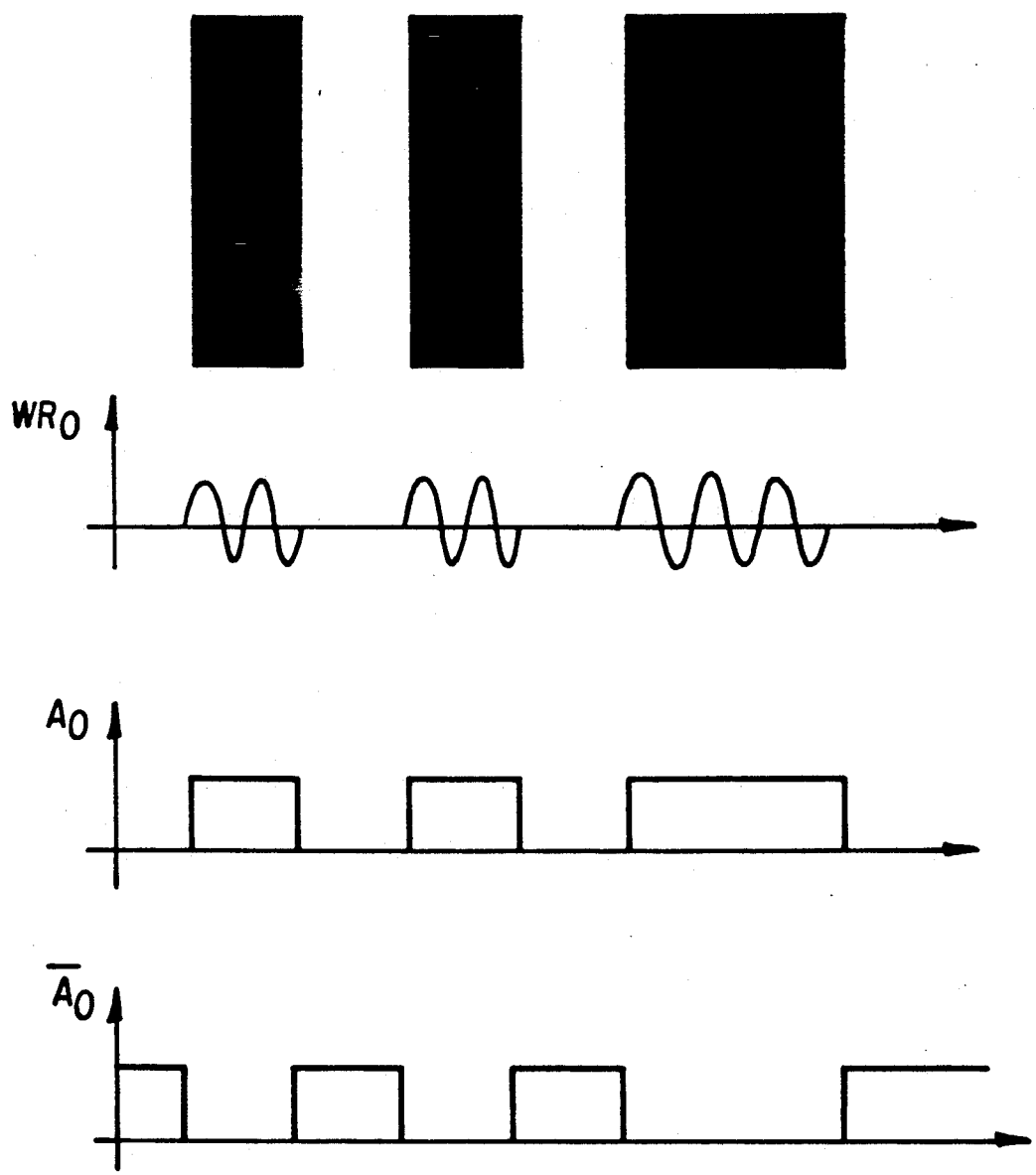
Figure 5:
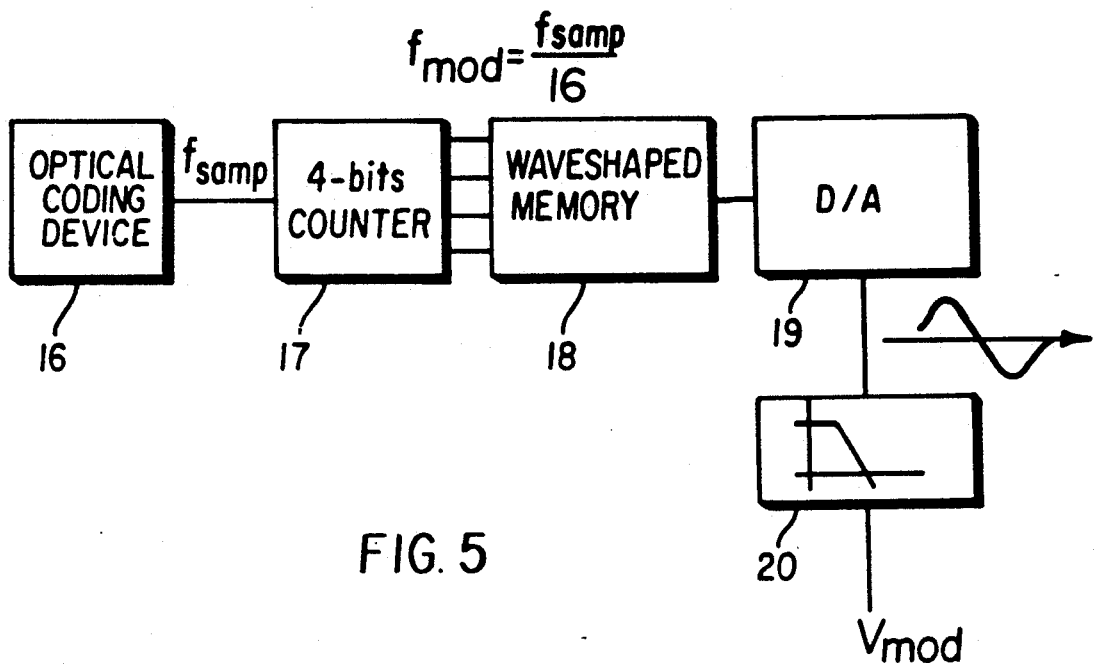
Figure 6:
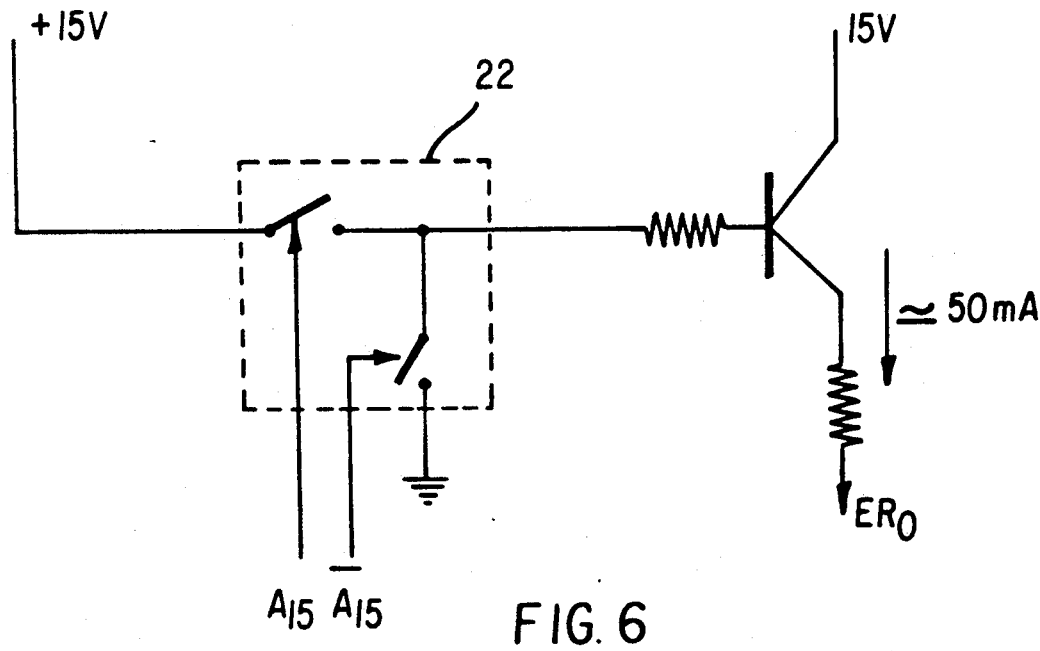
Figure 7:
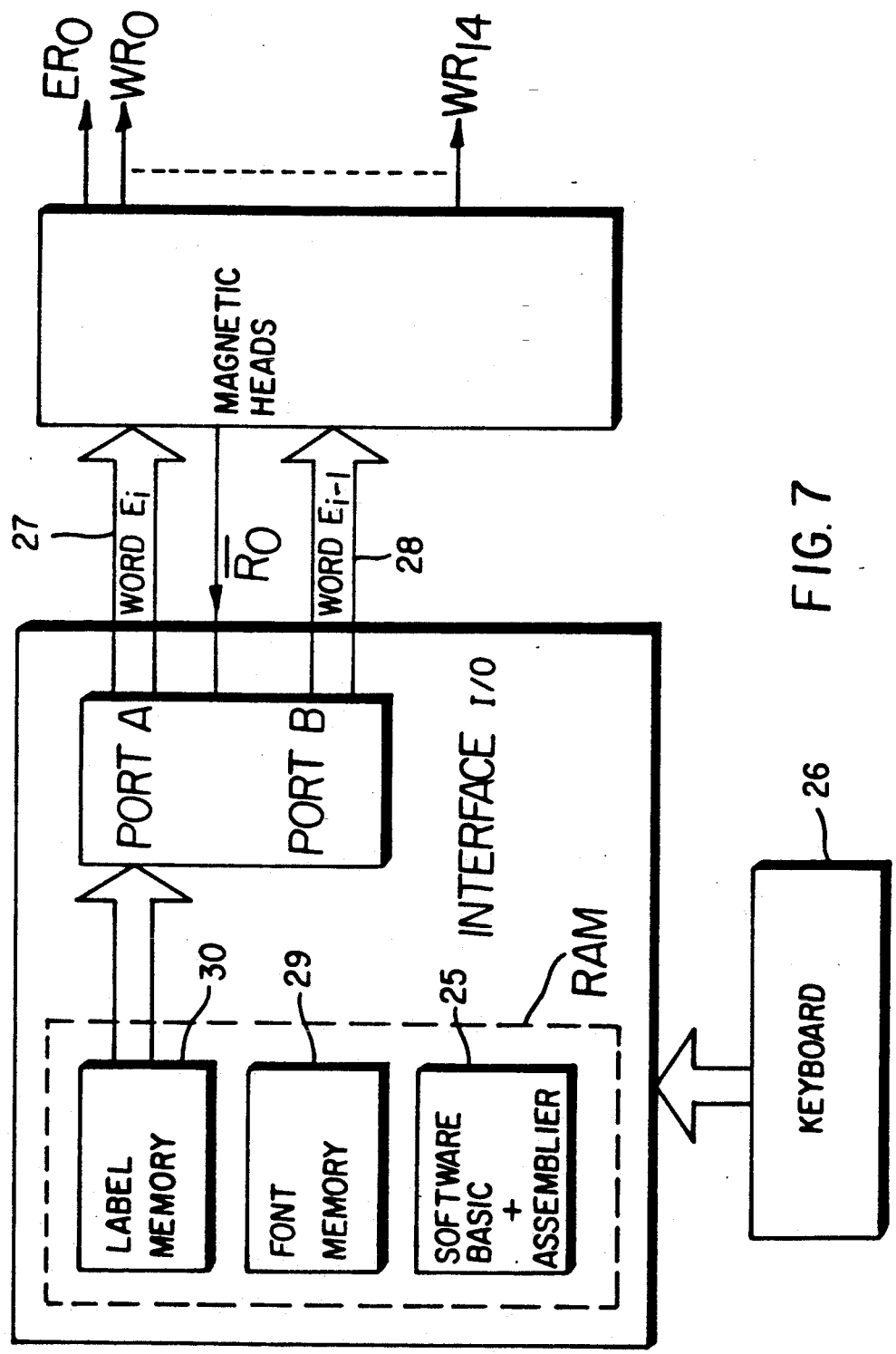
Figure 8:
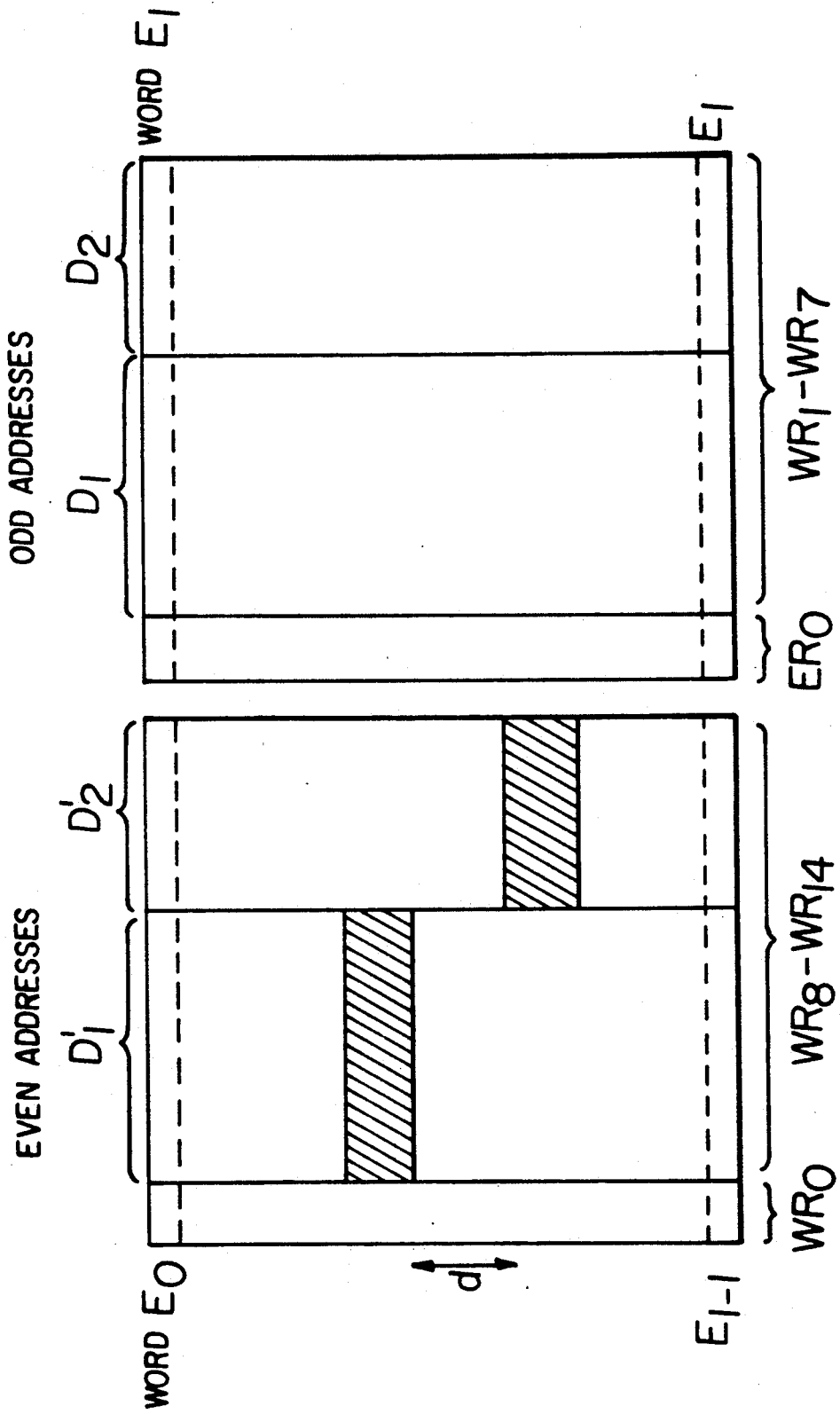
Figure 9:
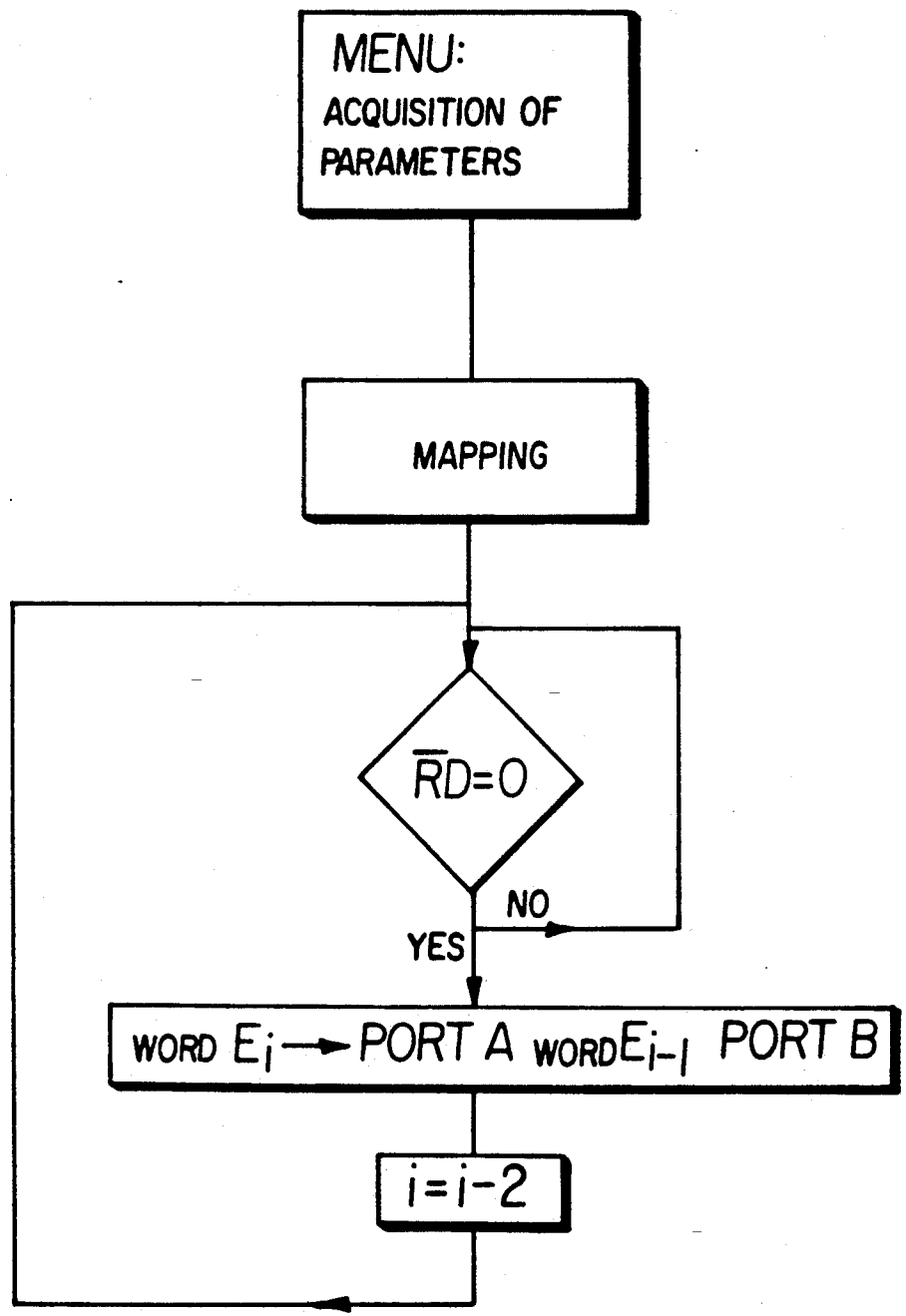

The following description refers to an apparatus for printing bar codes according to EAN (European Article Number) standard involving the process of the invention. It should be understood that the process can be used for other applications. The description refers to the accompanying drawings wherein: FIG. 1 represents an example of the type of bar codes which can be obtained by the process of the invention; FIG. 2 is a block diagram of the apparatus used for carrying out the process of the invention. (For clarity's sake, each part of the apparatus, representing the various stations has been simplified); FIG. 3 illustrates a possible arrangement of magnetic heads for carrying out the process of the invention; FIG. 4 illustrates how is generated the signal applied to the writing heads; FIG. 4a illustrates the form of the signals for controlling the magnetic heads; FIG. 5 illustrates schematically the different steps allowing to generate the modulation signal which is superimposed to the bias signal for obtaining writing signal; FIG. 6 illustrates how is generated the signal applied to the erasing head; FIG. 7 is a diagram of the system for controlling magnetic heads; FIG. 8 shows how is organized the label memory (bit map page); FIG. 9 is a simplified chart of the course of the operations generating the signals controlling the magnetic head.

FIG. 1 to which it is now referred represents the kind of bar codes which are obtained by the process of the invention, by way of example.

In the whole description, "to control" is used in the sense of "to pilot".

Bar codes the use of which is growing are made of series of lines (0.5-2.5 cm high in general) (200-500 μm wide in general) associated with numerical characters placed below said bars. Bar codes according to EAN standard is preceded by an additional character alined with said numerical characters indicating the type of bar codes printed. In an embodiment which will be described later, is provided an apparatus allowing to write alphanumerical characters above the code, for example, an advertising.

In general, the bar sets forming the code are delimited by a lateral separator made of two bars, generally thinner than the others and longer downwards, encompassing partially the numerical characters placed below the bar code. Similarly, a central separator also made of two bars identical to those of the lateral separators is provided.

These bar codes bear indication of the mark owner, the article code given by the manufacturer and are placed either on a label placed on the product or directly on the packaging of the product.

The reading is carried out by scanning the bar code with an optical pen or a laser, the passage of which generates a current which is function of the light reflected and proportional to the width of the black and white bars. Any defect in the printing of bars (density, width) inevitably results in a reading error, therefore it is necessary that the bars be exactly printed.

FIG. 2 to which it is now referred represents a simplified view of an apparatus which is useful in the practice of the process of the invention.

This apparatus comprises the following parts: a) a magnetic tape 1 forming an endless belt driven in the direction of arrow A by a motor represented as pulley 2;

the tape being guided along its path by rollers placed at several places along said tape;

b) paper tape 3 on which the bar code is printed. This tape is supplied by means of a roll 4, then the tape is driven by a motor represented by a pulley, passes in front of the transfer station 9 and fixing station 10 and then is wound on a receiving roll 5;

c) a writing/erasing station 6 comprising the assembly of magnetic heads, which will be described in detail later. In this station, are formed on the magnetic tape field gradients forming a latent image which is developable by means of a toner;

d) a development station 7 comprising a reserve of toner which is in contact with the rotative drum 8 equipped on a portion of its internal periphery by fixed magnets in odd number. The particles are driven by the magnetic portion of the drum and then in the absence of magnetization, are released on the magnetic tape when the later comes in contact with the drum. Toner particles are then attracted on field gradients formed on said magnetic tape. This station comprises a device generating vibrations on the support (for example a piezo-electric device) and allowing to remove the particles placed between the images to develop;

e) a transfer station 9 where the magnetic tape is in contact with the paper tape. In this station, if possible, all the toner particles are transferred by pressure means from the magnetic tape to the paper tape;

f) a fixing station 10 in which the toner particles are fused so as to fix them definitely on the paper tape;

g) a cleaning station 11, comprising a magnetic brush with a rotating core and a mechanical brush in order to demagnetize the tape and remove the residual particles of toner. After this step, the device is ready for a new printing cycle.

FIG. 3, to which it is now referred shows an arrangement of the magnetic heads for carrying on the process according to the invention. This arrangement of magnetic heads comprises:

a writing head WR$_0$ which prints actual bar codes;
an erasing head ER$_0$ which erases part of bars to insert numerical characters desired below the code. This erasing head will be controlled so that it will not erase the bars forming lateral and central separators;
a first assembly comprising seven writing heads arranged as follows:
 a first row D$_1$ comprising four magnetic heads (WR$_1$-WR$_4$) recording four parallel tracks;
 a second row D$_2$ out of line with D$_1$ and comprising three magnetic heads (WR$_5$-WR$_7$) forming staggered rows with D$_1$ heads.
This assembly allows the writing of numerical characters placed below the bar codes.
a second assembly comprising also seven writing heads arranged in the same manner as the preceding, i.e.:
 a row D'$_1$ comprising four recording heads (WR$_8$-WR$_{11}$);
 a second row D'$_2$ out of line with D'$_1$ and comprising three heads forming staggered rows with D'$_1$ (WR$_{12}$-WR$_{14}$).

This assembly allows to write alphanumerical characters above the bar code.

The device used to control these sixteen magnetic heads (fifteen of them being writing heads WR$_0$...WR$_{14}$ and one erasing head ER$_0$) will be described below in detail.

It should be understood that this arrangement of magnetic heads is not restrictive. As a matter of fact, an additional erasing head can be provided above the first erasing head. This additional erasing head transversaly movable, would allow to modulate the height of a bar code, by erasing the upper part of the bar code, if desired.

Similarly, an erasing head taking all the width of the magnetic tape can be provided; this erasing head placed before the heads assembly above cited would allow to perform or perfect the erasing of the magnetic tape before writing new data.

The figures to which it will be referred now illustrate how the signal applied to magnetic heads is formed.

In this respect, it is necessary to differentiate writing heads from erasing head.

FIG. 4 relates to writing heads (WR$_0$-WR$_{14}$). In an embodiment for practicing the process of the invention, a longitudinal recording is used, (in opposition to a perpendicular recording). The average diameter of the particles of toner is 25 μm and the wavelength of the recorded signal is 100 μm. It is obvious that for different sizes of particles, different wavelengths should be used, the optimal condition for obtaining a correct development being that the wavelength should be about three times the size of particles. Thus, according to the desired width of the bar desired, 1, 2...n wavelengths will be recorded. Moreover, as the bar codes are a series of more or less fine lines which can be very close, it is compulsory to record on the magnetic tape perfect sinusoids having very precise wavelengths. This precision in the recorded signal is compulsory for obtaining a correct reading of said code. For that purpose, the signal sent to writing heads is obtained by superposition of two components:

A first bias signal V$_{bias}$ intended to linearize the recording material and therefore to improve the quality of the recorded signal and the definition of the bar code. This bias signal, the frequency of which is about 80 kHz and the peak to peak amplitude is in the range of 200-300 V is obtained by means of a conventional power stage.

A modulation signal V$_{mod}$, the frequency of which F$_{mod}$ varies between 100 Hz and 10 kHz as a function of the tape speed and the peak to peak amplitude, varies between 2 and 15 V.

FIG. 5 to which it is now referred illustrates how is generated the modulation signal. An optical coding device 16 placed on the pulley driving the magnetic tape generates a sampling frequency, f$_{samp}$, as a function of the tape speed V according to the relation f$_{samp}$=kV, where k is a constant. This sampling frequency is divided by 16 in a 4 bit counter (17). Thus modulation frequency is obtained as f$_{mod}$=f$_{samp}$/16. This signal is introduced in the waveshaped memory (in our example a sinusoid). The signal is then converted into analog form, by means of an digital-to-analog converter (19), then goes through a low-pass filter (20) for the final shaping of the modulation signal V$_{mod}$; upon this step of reshaping of the signal, is provided a precorrection for modulating the signal as a function of the frequency so as to obtain a constant magnetization whatever the signal frequency. Thus, a perfectly sinusoidal signal is obtained, the wavelength of which is:

$$\lambda_{mod} = \frac{V}{f_{mod}} = \frac{V \cdot 16}{F_{samp}} = \frac{V \cdot 16}{k \cdot V} = \frac{16}{k}$$

thus, by correctly selecting the proportionality constant k, it is possible, regardless of the tape speed, to obtain exactly the desired wavelength, i.e. in our embodiment 100 μm.

We are now referring to FIG. 4, which shows how are combined the bias signal $V_{bias}$ and the modulation signal $V_{mod}$. For each writing head (WR$_0$-WR$_{14}$), the modulation signal $V_{mod}$ is added to the polarisation signal $V_{bias}$ by means of a trap filter (12). This "trap-filter" is a circuit which presents an infinite impedance on bias signal side and a very low impedance on the modulation signal side. Thus, the modulation signal is not spoiled by the bias signal. Each writing head has a modulation signal controlled with analog switches (13), themselves controlled by the signals generated by a computer.

When switch controlled by $A_i$ ($0=<i<=14$) is on, the other switch controlled by $\overline{A_i}$ is off. In this way, the desired number of wavelengths is sent to the writing heads. Conversely, i.e. when no signal is to be sent to the writing head, the switch controlled by $A_i$ is off, while the switch controlled by $\overline{A_i}$ is on.

FIG. 4a illustrates the above by way of example, with regard to writing head WR$_0$.

FIG. 6 to which it is now referred illustrates the way the signal sent to the erasing head ER$_0$ is generated.

To supply the erasing head ER$_0$, a continuous signal of about 50 mA is sufficient. As for the writing heads, the signal sent to the erasing head is controlled by a system of analog switches 22, themselves controlled by signals generated by a computer.

When the switch controlled by $\overline{A_{15}}$ signal is on, the switch controlled by $A_{15}$ is off. In this manner, the erasing signal is sent to the head. If the switches are reversed, no signal is sent to said erasing head.

So, from the above referring to FIG. 4, 4a, 5 and 6, fifteen writing heads and one erasing head are to pilot. For doing that, sixteen control signals $A_0$-$A_{15}$ are to generate. Complementary signals $\overline{A_0}$-$\overline{A_{15}}$ being obtained directly by a mere inverter.

FIG. 7 to which it is now referred is a diagram of the system used to control the magnetic heads.

The main means to carry on the process of the invention can be sorted out into three groups:

1) a software part 25 comprising a basic program and an assembler program. The basic program manages the dialog between the operator and the system (display of the menu + acquisition of the parameters). The parameters entered are sent to a storage zone to which the assembler program is given an access. The assembler program retrieves these parameters and makes a mapping, i.e, a binary representation of the label to print.

2) Devices to communicate with the outside.
   a) the communication with the operator. The basic program asks the operator to enter various printing parameters by means of keyboard (26). In a preferred embodiment, the operator is asked to enter the code itself, and the possible comments to be printed above the code, the selected wavelength, the width of the module (the module being the width unit of the bars forming the code, i.e. the thinner bar desired), the length of the label.
   b) the communication between the computer and the magnetic heads. This communication is ensured in the computer/magnetic heads direction by two 8-bit ports (27, 28) of a PIA (peripheral interface adapter) through which are sent the data to print, and in the opposite magnetic heads/computer direction by a control signal $\overline{RD}$ indicating that the magnetic heads are ready to receive a new piece of information. Other variants can be provided, e.g. signals for controlling driving motors, the tape tension or the toner supply.

3) A read-write memory comprising among others:
   a font memory (29) containing ASCII code for the characters and code to print. This memory will be used to generate the mapping of the label;
   a label memory (30) containing a binary representation of the label to make. FIG. 8 shows how this memory is organized. For clarity s sake, this zone is represented in the form of two juxtaposed 8-bit zones, one corresponding to even addresses ($E_{i-1}$-word), the other to odd addresses ($E_i$ word). The high order bit of the first zone corresponds to the control signal controlling the writing head WR$_0$; the high order bit of the second zone corresponds to the signal controlling the erasing head ER$_0$; the other seven bits of the first and second zones allow respectively to control the writing heads WR$_8$-WR$_{14}$ and WR$_1$-WR$_7$.

In a possible embodiment, the length of the label is divided into zones having a width equal to the selected wavelength, e.g. 100 μm. Thus, to each part of a 100 μm label are associated two 8 bit words stored at two successive addresses of the label memory (one even, the other odd), both words containing the control signal applied to each of the 16 magnetic heads within a 100 μm zone. Moreover, the magnetic heads being offset by a whole number of wavelengths, it is necessary to take this offset into account for the binary representation of the label. By way of example, both D'$_1$ and D'$_2$ bars are separated by a distance d; for obtaining correctly printed alpha numerical characters, data relating to D'$_2$ have to be offset by a number of addresses equal to d/100 μm. All the operations relating to the making of the label mapping are made by the assembler program.

FIG. 9 is a simplified chart, illustrating the course of the operations for generating control signals for each magnetic head. The different printing parameters entered by the operator are acquired by the Basic program which transfers them in a zone accessible to the assembler program. The latter generates from these parameters, a binary representation of the label to print, beginning from the first address of the label memory. Then, when the order is given (when control signal $\overline{RD}=0$), the microcomputer will retrieve in the label memory, beginning by the last address, the word $E_i$ containing the signals for controllong ER$_0$ and WR$_1$-WR$_7$ heads, and put them on PORT A of PIA and will retrieve the word $E_{i-1}$ containing control signals of WR$_0$ and WR$_8$-WR$_{14}$ heads to put them on PORT B of PIA, said words being sent to the different channels feeding the corresponding magnetic heads. The operation is repeated until all the storage memory corresponding to said label is scanned. Once the latent image corresponding to a label is recorded, the latent image corresponding to the following label is recorded and so on. At the same time, the tape rotation allows to pass this latent image in the various stations of the machine and to obtain the transfer of a visible image on paper tape (3).

In this manner, by means of the device above described it is possible to carry out the process of the invention.

By way of example, if bar codes of the type disclosed in FIG. 1 (EAN standard) are to print, by means of the head assembly described in FIG. 3, controlled as above described, the procedure will be as follows:

a) by means of row of heads $WR_1$-$WR_7$, the latent image of the first character indicating the type of bar codes to print is recorded, b) $WR_0$ head is controlled to print the lines forming the code, c) $ER_0$ is controlled to erase at least the writing zone 14 common to $WR_0$ and $WR_1$-$WR_7$ heads without affecting the lateral separator and also the central separator which must keep their initial length, d) the latent image of the numerical characters below the bar code is formed by means of $WR_1$-$WR_7$ heads and optionnally, the latent image of the comments which appear above said bar code by means of $WR_8$-$WR_{14}$ heads.

We claim:

1. A process to form on a magnetic web a latent image comprising two areas of information, overlapping each other, by means of an assembly of erasing and recording magnetic heads, said process being characterized in that it comprises the following stages:

a) the registration of a first type of information on a defined area of the magnetic web;

b) a partial erasing of the said information registered during stage a); and c) the registration of a second type of information, a part of which, at least, being in the area erased during stage b).

2. A process according to claim 1 wherein the information registered during the step c) is of the alphanumerical type.

3. A process according to claim 1 characterized in that the latent image is carried out in a continuous operation, at a speed varying from 20 cm/s to 100 cm/s.

4. An apparatus to perform the process according to claim 1 comprising at least three magnetic heads with at least one erasing head and two recording heads characterized in that said erasing head is disposed so as to erase the writing area (14) common to, at least, two recording heads.

5. A process according to claim 1 wherein the information registered during stage a) is of the bar-code type.

6. A process according to claim 5 wherein said first series of information comprises control information, the length of which is longer than the information itself, said control information being not modified by the erasing realized during stage b).

* * * * *